Jan. 11, 1944. R. E. McINTOSH 2,339,090
TORQUE OPERATED PROPELLER PITCH CHARGING DEVICE
Filed Dec. 7, 1939
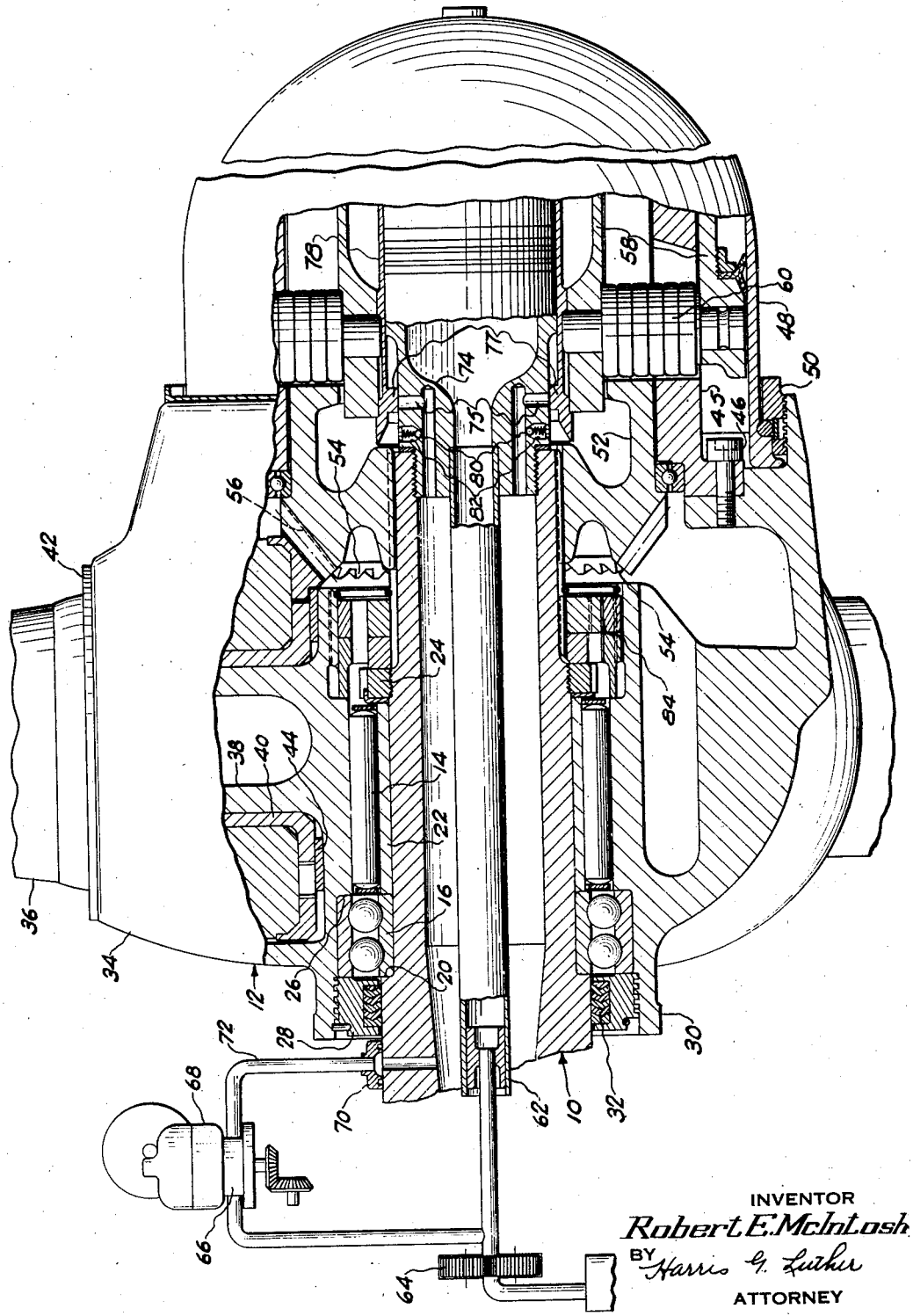
INVENTOR
Robert E. McIntosh
BY Harris G. Luther
ATTORNEY Patented Jan. 11, 1944

2,339,090

UNITED STATES PATENT OFFICE 2,339,090

TORQUE OPERATED PROPELLER PITCH CHANGING DEVICE

Robert E. McIntosh, Manchester, Conn., assignor to United Aircraft Corporation, East Hartford, Conn., a corporation of Delaware Application December 7, 1939, Serial No. 308,001

8 Claims. (Cl. 170—163)

This invention relates to improvements in aeronautical propellers and has particular reference to an improved construction for an automatic feathering, controllable-pitch aeronautical propeller.

An object of the invention resides in the provision of an improved propeller construction in which the torque of the propeller driving engine is transmitted to the propeller through the pitch changing mechanism and is balanced by a suitable oil pressure supplied from an engine driven source.

A further object resides in the provision of an improved controllable-pitch propeller construction in which vibrational forces between the propeller driving engine and the propeller are suppressed by the mechanical and hydraulic flexibility of the propeller pitch changing mechanism.

A still further object resides in the provision of an automatic feathering aeronautical propeller of the character indicated, in which the general speed of the propeller may be controlled by a speed responsive governor.

An additional object resides in the provision in a propeller of the character indicated of a hydraulic low pitch limit stop for the pitch mechanism.

Other objects and advantages will be more particularly pointed out hereinafter or will become apparent as the description proceeds.

In the accompanying drawing, in which like reference numerals are used to designate similar parts throughout, there is illustrated a suitable mechanical construction for the purpose of disclosing the invention. The drawing, however, is for the purpose of illustration only and is not to be taken as limiting the invention since it will be apparent to those skilled in the art that various changes in the illustrated construction may be resorted to without in any way exceeding the scope of the invention.

In the drawing, the single figure is a partly sectioned view of a controllable-pitch aeronautical propeller constructed according to the invention and a diagrammatic showing of the propeller pitch control instrumentalities.

Referring to the drawing in detail, the numeral 10 generally indicates a propeller drive shaft which may constitute a part of a propeller driving engine, not illustrated, and which projects from the engine or some suitable fixed support to support and drive the propeller.

A propeller hub, generally indicated at 12, is rotatably mounted on the shaft 10 by means of the roller bearing 14 and ball bearing 16. The bearing 14 is designed and located to carry the lateral or radial loads between the shaft 10 and the propeller while the bearing 16 carries the thrust or axial load and consequently has its inner race rigidly secured to the shaft and its outer race rigidly secured to the propeller. The inner race of the bearing 16 is clamped against the shaft shoulder 20 by means of the cylindrical spacer 22, which incidentally provides an inner race for the anti-friction elements of the roller bearing 14, and the nut 24 screw threaded onto the shaft against the end of the spacer opposite the inner race of the bearing 16. The outer race of the bearing 16 is clamped against a shoulder 26 provided in the hub 12 surrounding the shaft 10 by a nut 28 screw threaded into an internally threaded boss 30 formed on the rear end of the hub 12. This nut may be provided with an annular cavity surrounding the shaft 10 and filled with packing material 32 to provide an oil seal between the rear end of the propeller hub and the propeller drive shaft.

The hub 12 is provided with a plurality of integral blade sockets 34 within which the blades, as indicated at 36, are rotatably mounted in a manner well known to the art. In the case of hollow metal blades a concentric integral arm 38 is provided on the hub member within the blade socket 34 to extend into the blade cavity and transmit driving force from the hub to the blade. If the blade is formed of some relatively soft metal, such as an aluminum alloy, as is frequently the case, the inner portion of the blade cavity and the root or base end of the blade may be overlaid by a relatively hard metal bushing member 40 which constitutes a bearing member movable with the blade end and relative to the contacting portions of the propeller hub to reduce friction and prevent wear of the relatively soft metal of the blade end. The blade 36 is retained in the blade socket 34 by means of an annular anti-friction thrust bearing (not shown), resting upon the blade flange and lying against a retaining nut 42, and is restrained against inward movements relative to the hub by means of a suitable thrust washer 44 interposed between the end of the blade, or the blade end covering portion of the member 40, and a suitable surface formed in the blade socket surrounding the arm 38. As the construction for securing the propeller blades in the hub for pitch changing rotational movements is of common practice and well known to the prior art it is thought that no further description is necessary for the purpose of this disclosure.

The pitch changing mechanism comprises, in general, an outer cylindrical cam member 45, secured fixedly to the propeller hub by suitable means such as the cap screws 46, a cylinder 48 enclosing the mechanism and having one closed end and an open end secured to the propeller hub by suitable means such as the annular nut 50, an inner rotatable cam member 52 splined to the drive shaft 10 and having gear teeth 54 meshing with gear teeth 56 secured to a portion of the member 40 by resilient spring packs as is particularly illustrated and described in United States Patent Number 2,174,717, issued October 3, 1939, to Frank W. Caldwell et. al. for Multiposition controllable pitch propeller, a hydraulic piston 58 reciprocable in the cylinder 48 and a plurality of cam followers 60 which move with the piston 58 through diagonal cam slots in the members 45 and 52 to rotate the member 52 relative to the member 45 upon reciprocable movement of the piston 58 in the cylinder 48.

Hydraulic fluid may be continuously supplied to the outer or pitch reducing end of the cylinder 48 through a conduit 62 disposed within the hollow shaft 10 and leading from a source of hydraulic fluid of relatively low pressure such as the engine lubricating oil pump 64. The usual pressure relief valve as well as the engine lubricating system serves as a vent for oil forced from this pitch reducing end of the cylinder. In certain installations it may be unnecessary or undesirable to use fluid pressure to reduce the propeller pitch. In such cases this side of the piston may be directly vented to an oil sump without the interposition of the low pressure fluid.

Hydraulic fluid is led to the inner or pitch increasing side of the piston 58 within the cylinder 48 through the space between the conduit 62 and the shaft 10. This fluid may be supplied from a booster pump 66, through a valve controlled by the governor 68, and an oil collector ring 70, which leads the oil from the supply line 72 to the interior of the shaft 10.

With this arrangement, when the governor 68 demands a decrease in engine speed, hydraulic fluid is admitted to the pitch increasing side of the piston 58 from the booster pump 66 and acts to increase the propeller pitch and reduce the engine speed by increasing the load on the engine. When the propeller demand is for an increase in engine speed the governor acts to connect the space within the cylinder 48 at the pitch increasing side of the piston 58 with drain whereupon the pressure of the fluid supplied to the pitch decreasing side of the piston through the conduit 62, and the blade turning component of the engine torque will move the blades to a lower pitch position. In certain types of blades the action of centrifugal force on the blades 36 will also tend to reduce the blade pitch. Thus, by controlling the flow of high pressure fluid to and from the space within the cylinder 48 on the pitch increasing side of the piston 58, the governor can function to maintain the speed of the engine-propeller combination substantially constant by varying the propeller pitch. The high and low pressure fluid conduits may be conveniently separated at the cylinder end of the conduit by a suitable drilled plug 74 screw threaded into the end of the drive shaft 10. This plug may be provided with suitable apertures, as indicated at 75 cooperating with stops 77 carried by the sleeve 78 secured in the piston 58 to constitute a hydraulic low pitch limit stop for the propeller by cutting off the oil drain from the pitch increasing side of the piston 58 whenever the propeller reaches a predetermined low pitch position. In this case, check valves 80 would be provided in the apertures 82 to permit pitch increasing fluid to flow to the space at the pitch increasing side of the piston to move the piston from its low pitch position.

When the shaft 10 tends to turn relative to the propeller hub 12 the torque reaction is taken through the gear teeth 54 and 56 and the cams and cam followers and tends to rotate the propeller blades to decrease their pitch. This torque on the cam member 52 tends to rotate this cam relative to the member 45 and move the piston 58 through the intermediacy of the cam followers 60. Since movements of the piston 58 in a pitch decreasing direction are resisted by the fluid in the space at the pitch increasing side of the piston, the torque transmitted through the pitch changing mechanism will have a tendency to force the fluid out of this space. Sudden increases in torque due to vibrational disturbances will obviously increase this tendency. Some fluid may always escape from the space, either back through the pressure pump relief valve or to the drain line, depending on the position of the governor controlled valve, or by leakage through the oil transfer bearing and past the governor controlled valve in case the valve happens to be in position to block the fluid conduit leading to and from this space. In any case, the flow of fluid from the space will be relatively slow, due to the various restrictions in the fluid escape line, and will have a damping effect on the vibration induced movements of the piston, which damping effect in combination with the resiliency of the cams and other elements of the pitch changing mechanism and the spring packs between the blade ends and blade turning gears, and the general frictional resistance of the mechanism will effectively suppress the transmission of vibrational movements from the drive shaft to the propeller.

A major feature of the above described arrangement is the automatic feathering action of the propeller.

In normal operation of the propeller described above, the blade turning force incident to the transmission of engine torque through the pitch changing mechanism and in certain types of blades the blade turning force occasioned by the action of centrifugal force on the blades both urge the blades to turn in a pitch decreasing direction and are opposed by the force exerted by the pressure fluid on the pitch changing mechanism urging the blades to turn in a pitch increasing direction. In the event of engine failure the propeller would drive the engine or at least attempt to, thereby causing a reversal of the torque between the engine and the propeller, which reversed torque, acting through the pitch changing mechanism would urge the blades to turn in a pitch increasing direction. The governor would act to connect the space at the pitch increasing side of the pitch changing mechanism either with hydraulic fluid under pressure or with drain depending upon the speed at which the propeller drives the engine but would not in any case interfere with the pitch increasing effect of the reversed engine-propeller torque. With some types of conventional propeller blades, however, the centrifugal twisting moment on the blades would oppose the pitch increasing efforts of the reversed torque and might be sufficient, in some cases, to prevent the pitch increasing effort of the reversed torque from bringing the propeller to a feathered condition. This pitch decreasing effect of the centrifugal twisting moment, or such portion thereof as may be necessary, may be neutralized by providing the blades with counterweights, to counteract the pitch decreasing effect of the centrifugal twisting moment or as illustrated and described in United States Patent No. 2,032,255, issued February 25, 1936, to Frank W. Caldwell, give this twisting moment a positive pitch increasing effect if desired. With the above described arrangement, and in propellers equipped with blades having either no pitch reducing tendencies or having pitch increasing tendencies as soon as the propeller began to drive the engine, the propeller would be automatically turned to their limiting high pitch or feathered condition.

Suitable limit stops, as indicated at 84, may be provided in addition to the hydraulic limit stop mentioned above to positively limit the total pitch changing movements of the blades so that the blades cannot be turned beyond a predetermined limiting position in either direction.

While a suitable mechanical embodiment has been hereinabove described and illustrated in the accompanying drawing for the purpose of disclosing the invention, it is to be understood that the invention is not limited to the particular arrangement so illustrated and described, but that such changes in the size, shape and arrangements of the various parts may be resorted to as come within the scope of the sub-joined claims.

Having now described the invention so that others skilled in the art may clearly understand the same, what it is desired to secure by Letters Patent is as follows:

1. In a controllable-pitch propeller adapted to be mounted on a propeller drive shaft, a propeller pitch changing mechanism so constructed and arranged that each pitch changing movement of the propeller blades is accompanied by a proportional rotational movement of the entire propeller relative to the propeller drive shaft and torque transmitted from said drive shaft to said propeller is transmitted through said pitch changing mechanism and tends to turn the propeller blades to change the pitch thereof in combination with a control for said pitch changing mechanism operative to actuate said pitch changing mechanism to restore the propeller pitch to some prescribed setting whereby the propeller pitch will be maintained in general at the prescribed setting but torque variations of a vibrational character will be transmitted into temporary variations of propeller pitch.

2. In the combination of a controllable-pitch propeller and a propeller drive shaft, a propeller hub rotatably mounted on said drive shaft against substantial movement axially of said shaft and provided with blade retaining sockets, a blade rotatably mounted in each socket, an element fixed on said shaft and operatively connected with all of said blades to constrain said blades to identical pitch changing movements, hydraulic mechanism interconnected between said hub and said shaft operative to rotate said hub relative to said shaft and thereby change the pitch of said blades, and control means including speed responsive mechanism controlling the application of hydraulic fluid under pressure to said hydraulic mechanism.

3. In the combination of a controllable-pitch propeller and a propeller drive shaft, a double acting hydraulic pitch changing mechanism constituting the sole driving connection between said drive shaft and said propeller, and shaft carried means for distributing hydraulic fluid to the opposite sides of said mechanism.

4. In a controllable-pitch propeller adapted to be mounted on a propeller drive shaft, a pitch changing mechanism constituting the torque connection between said propeller and said shaft, hydraulically actuated means for controlling the pitch changing movements of said mechanism and resisting the reaction of the torque transmitted therethrough, and means for conducting hydraulic fluid to and from the opposite sides of said pitch changing mechanism, said pitch changing mechanism comprising, a cylinder, a double-acting piston reciprocable in said cylinder, a cam member fixed relative to said propeller, a cam member fixed relative to said drive shaft and having pitch changing connection with the propeller blades, and cam folowers carried by said piston for rotating one of said cam members relative to the other upon reciprocatory movement of said piston in said cylinder.

5. In the combination of a controllable-pitch propeller and a propeller drive shaft, a propeller hub rotatably mounted on said drive shaft against substantial movement axially of said shaft and provided with blade retaining sockets, a blade rotatably mounted in each socket, an element fixed on said shaft and operatively connected with said blades to decrease the pitch angle of said blades when said shaft rotates relative to said hub in the direction of the drive between said shaft and said propeller and to increase said pitch angle when said propeller overruns said shaft, hydraulic mechanism operatively connected between said hub and said shaft and including a movable element operative to rotate said hub relative to said shaft and thus change the pitch of said propeller upon the application of hydraulic fluid under pressure thereto, and means including speed responsive mechanism controlling the application of hydraulic fluid under pressure to said movable elements.

6. In the combination of a feathering-type controllable-pitch propeller and a propeller drive shaft, a propeller hub rotatably mounted on said drive shaft against substantial movement axially of said shaft and provided with blade retaining sockets, a blade rotatably mounted in each socket, an element fixed on said shaft and operatively connected with said blades to decrease the pitch angle of said blades on a tendency of said shaft to overrun said propeller and to increase the pitch angle of said blades on a tendency of said propeller to overrun said shaft, hydraulic mechanism operatively connected between said hub and said shaft to effect an overrunning tendency in either direction upon a corresponding application of hydraulic fluid thereto, and control means including a speed responsive governor hydraulically connected with said hydraulic mechanism and controlling the application of hydraulic fluid thereto, said shaft carried element being effective to bring said propeller blades to a feathered condition in the event of a continuing tendency of said propeller to overrun said shaft coupled with a disablement of said speed responsive governor.

7. In the combination of a controllable-pitch propeller and a propeller drive shaft, a propeller hub rotatably mounted on said drive shaft against substantial movement axially of said shaft and provided with blade retaining sockets, a blade rotatably mounted in each socket, a gear fixed on said shaft, a gear segment fixed on the socket included end of each propeller blade and meshing with said shaft carried gear to decrease the pitch angle of said blades on a tendency of said shaft to overrun said propeller and to increase the pitch angle of said propeller blades on a tendency of said propeller to overrun said shaft, hydraulic mechanism operatively connected between said propeller and said shaft to effect an overrunning tendency in either direction, and control means including a speed responsive governor hydraulically connected with said hydraulic mechanism and controlling the operation thereof.

8. In the combination of a controllable-pitch propeller and a propeller drive shaft, a double-acting hydraulic pitch changing mechanism having an element fixed to said shaft and operatively connected with said blades, an element fixed to said propeller, and means for applying force exerted by the pressure of hydraulic fluid between said elements, said pitch changing mechanism constituting the sole driving connection between said drive shaft and said propeller, and means carried by said drive shaft for distributing hydraulic fluid to the opposite sides of said double-acting mechanism.

ROBERT E. McINTOSH.